United States Patent [19]

Karnofsky

[11] 4,422,901

[45] Dec. 27, 1983

[54] APPARATUS FOR THE CONTINUOUS SOLVENT EXTRACTION OF BITUMEN FROM OIL-BEARING SAND

[75] Inventor: George B. Karnofsky, Pittsburgh, Pa.

[73] Assignee: Dravo Corporation, Pittsburgh, Pa.

[21] Appl. No.: 431,677

[22] Filed: Sep. 30, 1982

Related U.S. Application Data

[60] Continuation of Ser. No. 202,146, Oct. 30, 1980, abandoned, which is a division of Ser. No. 41,769, May 23, 1979, abandoned.

[51] Int. Cl.$^3$ .................. B01D 11/02; C10C 3/08
[52] U.S. Cl. .................. 196/14.52; 196/100; 196/134; 422/268
[58] Field of Search .................. 202/146, 169, 174; 196/14.52, 100, 105, 134, 139; 422/268, 275, 280, 281; 208/11 LE

[56] References Cited

U.S. PATENT DOCUMENTS

| | | | |
|---|---|---|---|
| 2,663,624 | 12/1953 | Hutchins et al. | 422/268 |
| 3,161,581 | 12/1964 | Tiedse et al. | 196/14.52 |
| 3,208,930 | 9/1965 | Andrassy | 208/11 LE |
| 3,475,318 | 10/1969 | Gable et al. | 208/11 LE |
| 3,856,474 | 12/1974 | Pittman et al. | 196/14.52 |
| 4,096,057 | 6/1978 | Porritt et al. | 196/14.52 |
| 4,130,474 | 12/1978 | Anthony | 208/11 LE |
| 4,139,450 | 2/1979 | Hanson et al. | 208/11 LE |
| 4,221,764 | 9/1980 | Saxon | 422/268 |

Primary Examiner—Bradley Garris

Attorney, Agent, or Firm—Parmelee, Miller, Welsh & Kratz

[57] ABSTRACT

In a continuous process for the extraction of crude refinery stock from oil-bearing sand, miscella produced earlier in the process is returned and mixed with oil-bearing sand to provide a feed slurry which, after heating, is separated into two streams, one of which is comprised predominantly of the coarser sand particles in the feed sand and miscella and the other of which contains most of the fine sand particles in the feed slurry. Miscella extracted by hot solvent from one of these streams is recycled to produce at least part of the miscella returned to produce the feed mix, and the other stream is processed to remove at least most of the sand and yield a miscella which is then distilled to separate the solvent for recycle to the extraction stages. Generally stated, a decantation step involving countercurrent extraction of the feed slurry will be used with sands which are comprised largely of fine particles. Percolation and separation of miscella along with solvent extract of bitumen from the sand is used where the sand in the feed mix is predominantly coarse. The spent sand from both streams is combined, and being still wet with solvent, is subjected to steam stripping, yielding solvent vapor. The hot vapors which result are first used to preheat the feed slurry followed by condensation and separation of solvent, which is recycled into the system, and water. Heat is also recuperated from the spent sand to preheat the feed slurry.

3 Claims, 6 Drawing Figures

APPARATUS FOR THE CONTINUOUS SOLVENT EXTRACTION OF BITUMEN FROM OIL-BEARING SAND

This is a continuation of application Ser. No. 202,146, filed Oct. 30, 1980, now abandoned, which was a division of application Ser. No. 41,769, filed May 23, 1979, now abandoned.

This invention is for the recovery by a solvent process of bitumen from oil-bearing sand, usually referred to as "oil sand" but also termed "tar sand." The term "oil sand," as used herein, refers to more or less loosely occurring sand particles and to hard but easily dispersed agglomerates of sand particles and also to crushed sandstone in the pores of which bitumen too viscous to flow is contained. The sand consists of small particles ranging in size from a maximum of 20 mesh to several microns.

Oil which is pumped from wells comes from subterranean strata as a flowable liquid. However, there are underground deposits which contain oil too viscous to flow even when steam is discharged into the well. Oil sands of a generally similar character occur in abundant deposits at or near the surface of the ground where they can be economically mined, but in which the oil also is too viscous at ambient temperatures to flow.

It is known that a petroleum product can be won from oil sand by cracking and vaporizing the oil from the sand at high temperatures. The product so recovered, being cracked under uncontrolled conditions, makes poor feed stock for an oil refinery.

Another method presently in use involves floating the bitumen by the immersion of the oil sand in hot water and a less viscous hydrocarbon. Experience with this process so far has resulted in a relatively low yield of bitumen, and resulting residue, comprising a mixture of sand, water and bitumen, settles very slowly, also creating an obnoxious environmental disposal problem.

Solvent extraction of the oil from sand has been proposed but has not been considered practical for processing of large tonnages of sand on a commercial basis. It has heretofore been considered that solvent extraction is energy inefficient in that a high percentage of the extracted oil has to be burned to provide the heat required for the process, so that the net percentage of the fuel ultimately recovered would not justify the investment for a plant or its continued operation. It has also been supposed that solvent extraction did not lend itself to the very large scale of operation required for operation on a commercial scale. I am not aware of any commercially satisfactory solvent extraction plant having heretofore been developed. In one solvent extraction process described in U.S. Pat. No. 3,459,653, a hydrocarbon solvent is used and addition of a specific amount of water to a slurry that is to be filtered is made so as to increase the rate of filtering and prevent blockage of a filter unit, while the present process, through the use of an elutriator and miscella clarifier, substantially removes fine material from the main processing stream.

The present invention is for a thermally efficient process and apparatus for the solvent extraction of bitumen from oil sand which moreover results in a spent sand residue producing no environmental problems. A thermal efficiency of the order of at least 92% can be expected with oil sand having at least 10% oil content, which means that only about 8% of the extracted fuel is required to provide heat for the operation of the continuous extraction process.

As in any continuous solvent extraction process, three basic steps are required: (1) countercurrent flow of solvent to the raw material to be processed resulting in a solution or miscella of solvent and the extracted product and a residue, containing solvent, of the solid material which has been processed; (2) separation and separate recovery of the solvent from the miscella to produce product, in this case, bitumen product; (3) stripping and recovery of solvent from the solvent-wet residue and subsequent discharge of the stripped residue to waste.

In the present invention, step (1) is initiated by slurrying with miscella the oil sand from which the bitumen is to be extracted. Heat for effecting steps (2) and (3) is supplied by steam from an external source. Step (2) is carried out in a multiple effect evaporator, combined, if necessary, when there are low boilers in the bitumen, with distillation means to separate the low boilers from the solvent. Step (3) utilizes direct contact of the spent residue with steam.

BRIEF DESCRIPTION OF THE INVENTION

I have observed that many tar sands are relatively coarse. Specifically, more than 80 percent of the sand is between 50 and 20 mesh. In a preferred embodiment of this invention the aforesaid slurry of oil sand in miscella is elutriated so as to separate the relatively coarse particles from the fine particles. The coarse particles are extracted with solvent by percolation, that is, by forming beds of the coarse and through which solvent or miscella can flow by gravity at practical rates. The fine particles elutriated from the sand are extracted by countercurrent decantation.

My invention also recognizes that the proportion of coarse particles in the sand may not be sufficient to justify two extraction systems. In that case, the extraction of all of the sand is carried out by countercurrent decantation.

In the case where the coarse fraction is too small to justify extraction of the coarse fraction by percolation, the incoming sand at ambient temperature is first mixed with miscella, earlier produced in the continuous process, which in the process has been heated to a temperature near but below the boiling point of the heterogeneous azeotrope of solvent and water. This miscella, when mixed with the feed sand, forms a slurry which, while deriving heat from the miscella, requires still further heating. Heat exchangers, disposed in series, heat the feed mix with recuperated heat progressively until the slurry reaches the desired temperature.

At this point, the feed slurry is separated by gravity thickening into two streams, the overflow containing extremely fine sand particles suspended in miscella, and the underflow comprising the remaining components of the sand as a thick slurry in miscella. The stream with the extremely fine sand predominating is subsequently clarified and filtered to remove solids. The solids resulting from filtering are washed with solvent. Filtrate and washings are combined with the overflow from the clarifier and discharged into an evaporation system, to separate the solvent and product oil.

The underflow with the relatively coarse sand particles from the separation above described is further processed with heated solvent to extract the bitumen therefrom by countercurrent decantation. The miscella so produced is returned and used to first contact the incoming feed sand and initially produces a hot slurry as above described, although not sufficiently hot for the most satisfactory result.

The other product of countercurrent decantation is a solvent-wet residue of spent sand. This residue, combined with fines filtered from the overflow, is continuously fed into a steam stripper, preferably a rotary kiln, where the solvent is evaporated by direct contact with steam. The mixture of solvent and water vapor so produced flows to a heat interchanger where it is condensed by heating the feed slurry (before its separation into the two streams above referred to) to the desired temperature. The resulting condensate is separated into hot solvent subsequently reused in the extraction process, and distilled water.

The hot spent residue sand discharged from the kiln enters a mixer where it is mixed with water to produce a hot sand-slurry mixture from which heat is recuperated for use in heating the feed slurry.

In the case where the coarse fraction of the sand predominates, the incoming sand, as before, is first mixed with miscella and the resulting slurry is further heated to the desired temperature. The feed slurry is then separated by gravity into two streams, the overflow containing the fine and extremely fine sand particles suspended in miscella and the underflow comprising the coarse components of the sand as a thick slurry. The stream with the fine and extremely fine particles then enters a first thickener of a countercurrent decantation system. The overflow from the first thickener of the countercurrent decantation system is clarified to remove the extremely fine particles as a slurry which is filtered. The underflow from the elutriator in which the coarse and fine sand particles are separated is a thick slurry which is washed with solvent by percolation.

The invention may be more fully understood by reference to the accompanying drawings schematically illustrating my invention. FIGS. 1 to 5 are especially applicable to oil sand in which the fines predominate, and FIG. 6 to sand comprised of coarse particles.

Generally, bitumen will be most effectively removed by a solvent comprised in part of an aromatic compound. Where cooling water is available to condense the solvent vapors, one suitable solvent comprises a mixture of hexane with about 20% benzene. If air cooling is used to condense vapors, a mixture of heptanes with about 20% of toluene may be preferable. These, however, are typical and other solvents well known in the art may be used. Since water is often contained in the ore, the maximum extraction temperature is near the boiling point of the heterogeneous azeotrope of the hydrocarbons and water.

Not infrequently, the bitumen which is extracted from the sand may contain compounds, boiling below 500° F., which will distill with the solvent and impair the effectiveness of the solvent. Provision is here made for the separation of these low boilers from the solvent.

Tar sand occurs either as soft deposits, easily broken, which disintegrate rapidly in hot solvent, or as hard rocks. The former needs little preparation for extraction, since even a large piece can be fed into the mixer. The latter must be crushed prior to extraction.

Figure 1:
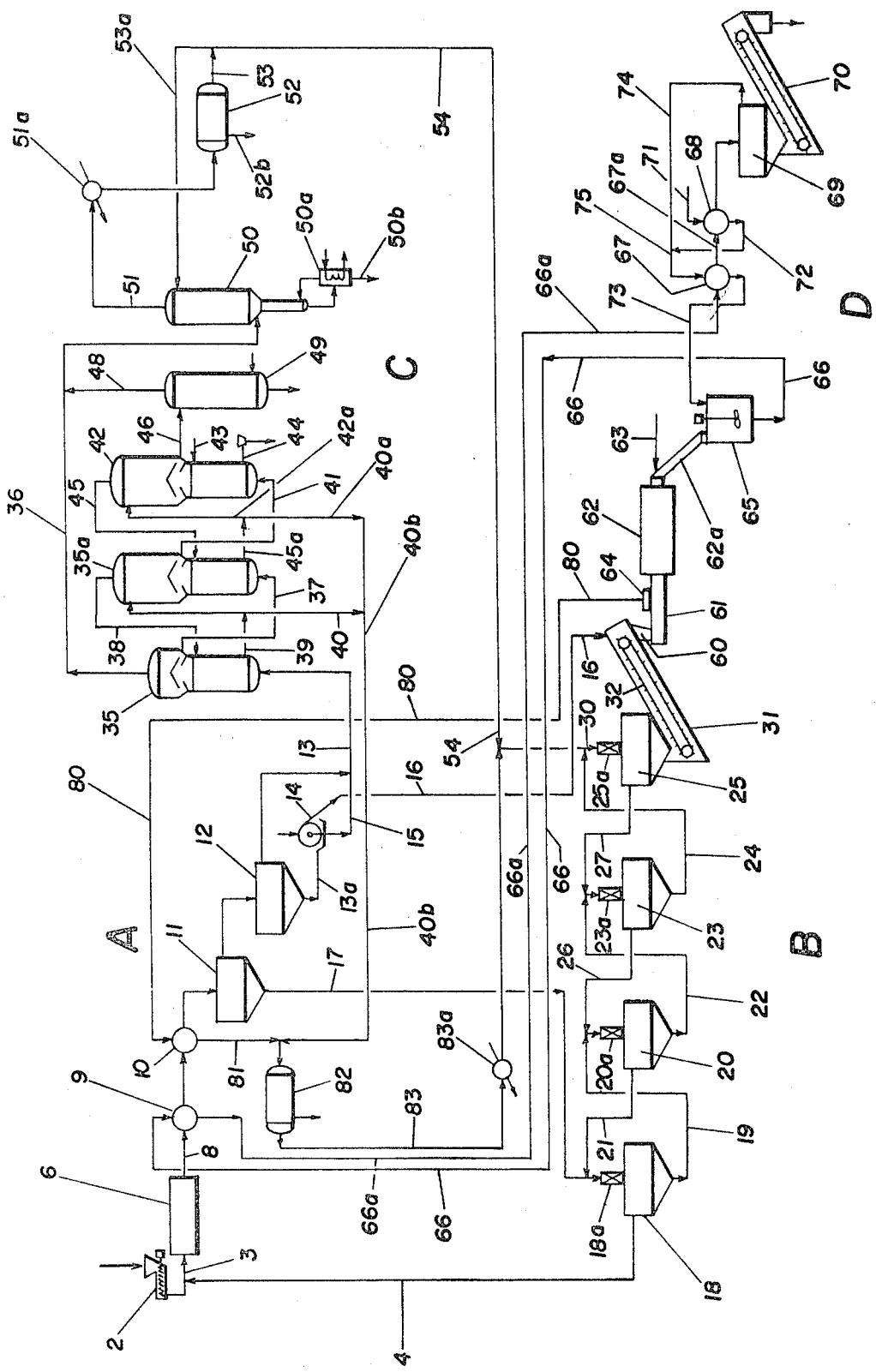
FIG. 1 is a schematic view of the overall plant using an apparatus showing one embodiment.
Figure 2:
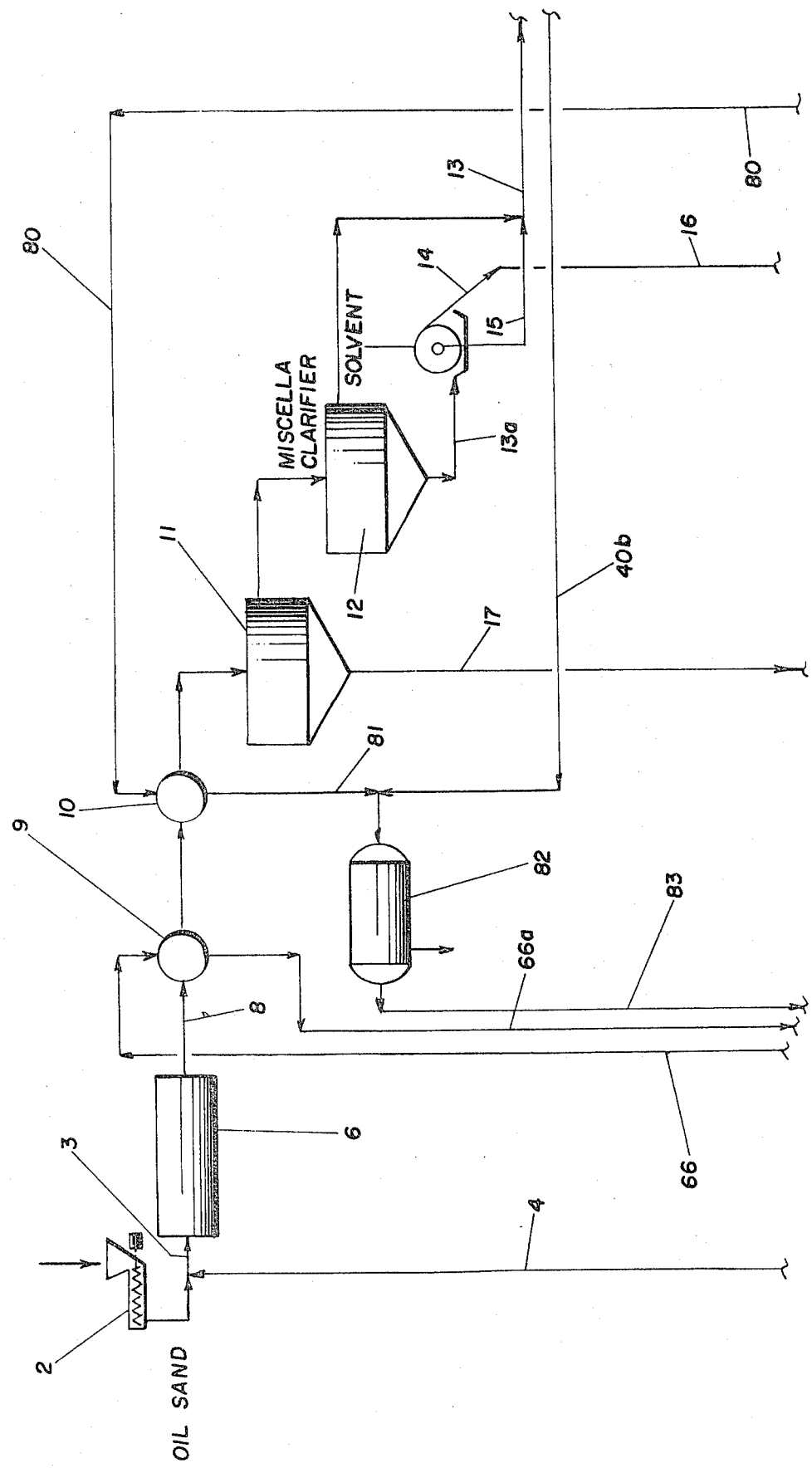
FIG. 2 is a schematic view, on a larger scale, of that portion within the area designated generally as A in FIG. 1.

After start-up, the operation is continuous, as contrasted to intermittent or batch operation. Referring first to FIGS. 1 and 2, the sand, after undergoing preparation for processing, is introduced through a seal 2 of any well-known construction (often comprising a screw conveyor) into duct 3 where it mixes with miscella flowing from pipe 4 into duct 3. This miscella comprising solvent and bitumen produced in the operation of the process, as hereinafter explained, may typically be at a temperature in the range of 160° F. to 165° F. The combined sand and miscella flows through pipe 3 and is discharged into feed mixer 6 where the mixture is thoroughly agitated to produce a flowable slurry that discharges into a duct 8.

Duct 8 includes at least two heat interchangers 9 and 10 in series where the slurry is progressively heated to processing temperature. The hot slurry is then discharged into the thickener 11 wherein the coarser particles settle to the bottom to be taken away through the underflow pipe 17.

Thickener 11 is the first in a series of several such thickeners. Overflow from the thickener 11 discharges into a clarifier 12 where most of the solids settle to the bottom as underflow. The underflow is transferred through pipe 13a to a continuous filter 14 such as vacuum drum filter where the mixture of miscella and solids is filtered and the filter cake which forms on the drum is washed with solvent. The resulting filtrate is carried through pipe 15 which connects into the overflow pipe 13. This pipe leads to the evaporation system (area C of FIG. 1).

Washed and spent filter cake is discharged through duct 16 into the entering end of the residue stripper (area D of FIG. 1) for ultimate disposal, as hereinafter explained.

Figure 3:
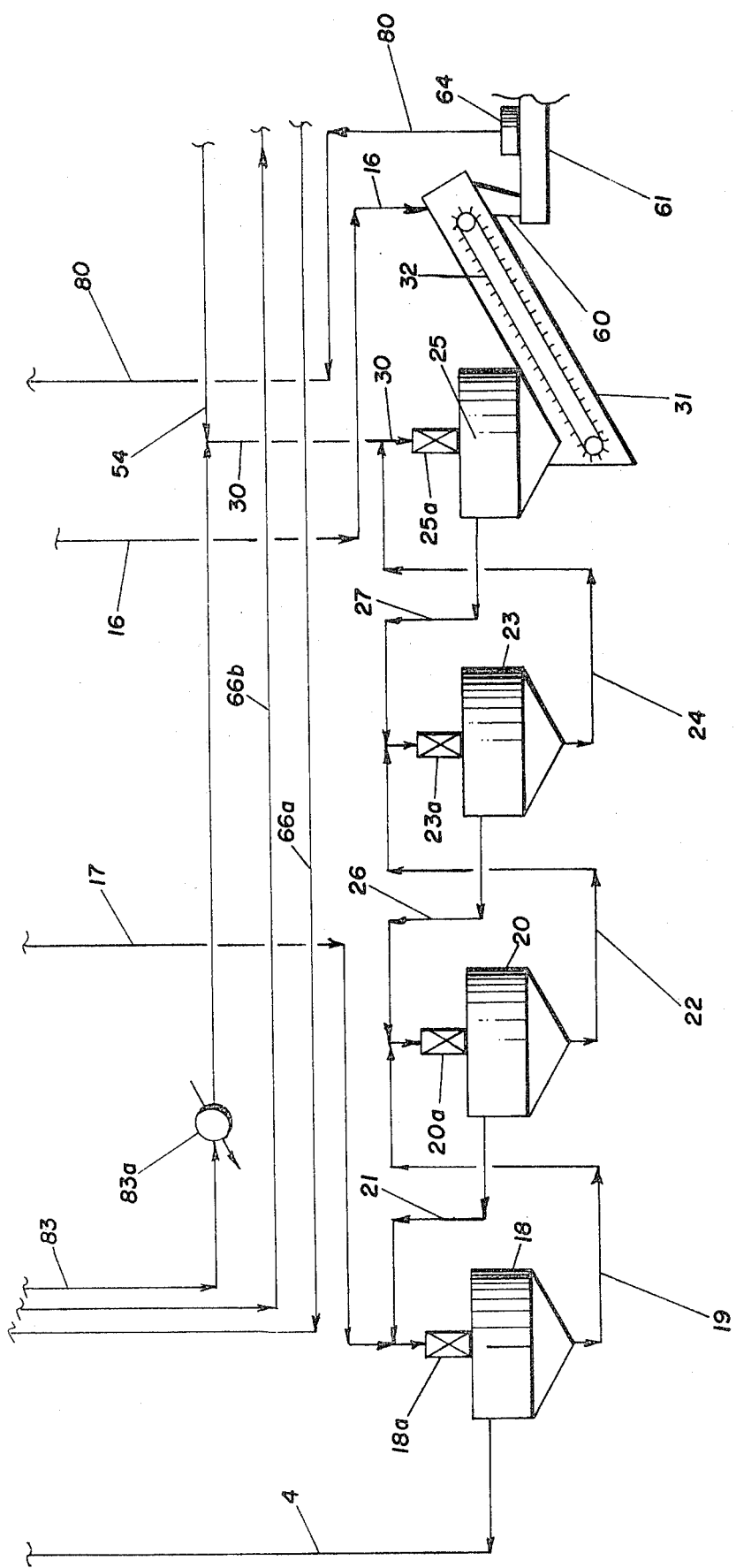
FIG. 3 is a schematic view on a larger scale of the area designated as B in FIG. 1.

Underflow from the first thickener 11 is transferred through conduit 17 to the second thickener 18 in area B of FIG. 1, as shown in more detail in FIG. 3. Continuing with the processing in area B, there is a generally conventional counterflow sand-solvent extraction apparatus wherein the underflow from the first thickener 11 is transferred to the second thickener 18 through an in-line mixer indicated at 18a.

Overflow from the second thickener 18, comprising a bitumen-solvent miscella, is transferred through pipe 4 to return and mix with the incoming feed sand, as shown in area A of FIG. 1. Underflow from the second thickener is transferred through pipe 19 through an in-line mixer 20a to the top of the third thickener 20. Overflow from thickener 20 is returned to mixer 18a of the second thickener through pipe 21. In like manner, underflow from thickener 20 is transferred through pipe 22 through an in-line mixer 23a into the top of the fourth thickener 23 and underflow from the fourth thickener is transferred through pipe 24 into the last of the series of five thickeners, designated 25, through in-line mixer 25a. Overflow from the fourth thickener is transferred through pipe 26 to the in-line mixer 20a at the top of the third thickener. Overflow from the fifth thickener 25 is transferred to the in-line mixer 23a at the top of the fourth thickener through pipe 27.

While a series of five thickeners has been described, there may be more or fewer of these thickeners similarly disposed and interconnected for countercurrent extraction. Pumps (not shown) are, of course, supplied as is customary where a series of thickeners is used, to effect the transfer of overflow and underflow from one thickener to another as above described.

Solvent, at the temperature desired for extraction, is introduced into the top of the fifth thickener 25 through pipe 30 and in-line mixer 25a. The solvent supply source to the pipe 30 is not shown in FIGS. 1 and 2 but will be hereinafter described in connection with subsequent figures.

Discharge of the underflow from the last thickener 25 of the series is into a conveyor 31 wherein there is an endless drag belt 32 that slopes upwardly from beneath the thickener 25 to a level above the overflow outlet from this thickener 25. The conveyor 31 is of a type that will remove the solids while liquid drains back to the bottom of the thickener. A well-known type of drag conveyor has been schematically illustrated for this purpose. The drag belt discharges the spent solvent-wet residue near the high point of the bottom of the conveyor 31. Washed solids from filter 14 are transferred through conduit 16 into the top of the conveyor 31.

To this point, the description has dealt primarily with the extraction of oil from oil sand producing miscella and solvent-wet residue, wherein feed sand is continuously supplied to the system and continuously combined with returned miscella to produce a feed slurry which then passes through feed slurry heaters 9 and 10. The heated feed slurry is then continuously separated into two streams, one comprising miscella in which the finer particles of sand predominate and the other comprising a thickened slurry of sand in miscella wherein the remaining sand, principally the relatively coarser sand, is contained. This thickened slurry is treated countercurrently with solvent to extract the bitumen therefrom and thereby generate more miscella which is then combined with the incoming feed sand. The miscella stream containing the fines is clarified; underflow from the bottom of the clarifier is filtered and washed with solvent. The filtrate and clarified miscella are combined in pipe 13. Spent solvent-wet fine sand from the filter is combined in the conveyor 31 with solvent-wet sand extracted by countercurrent decantation.

Figure 4:
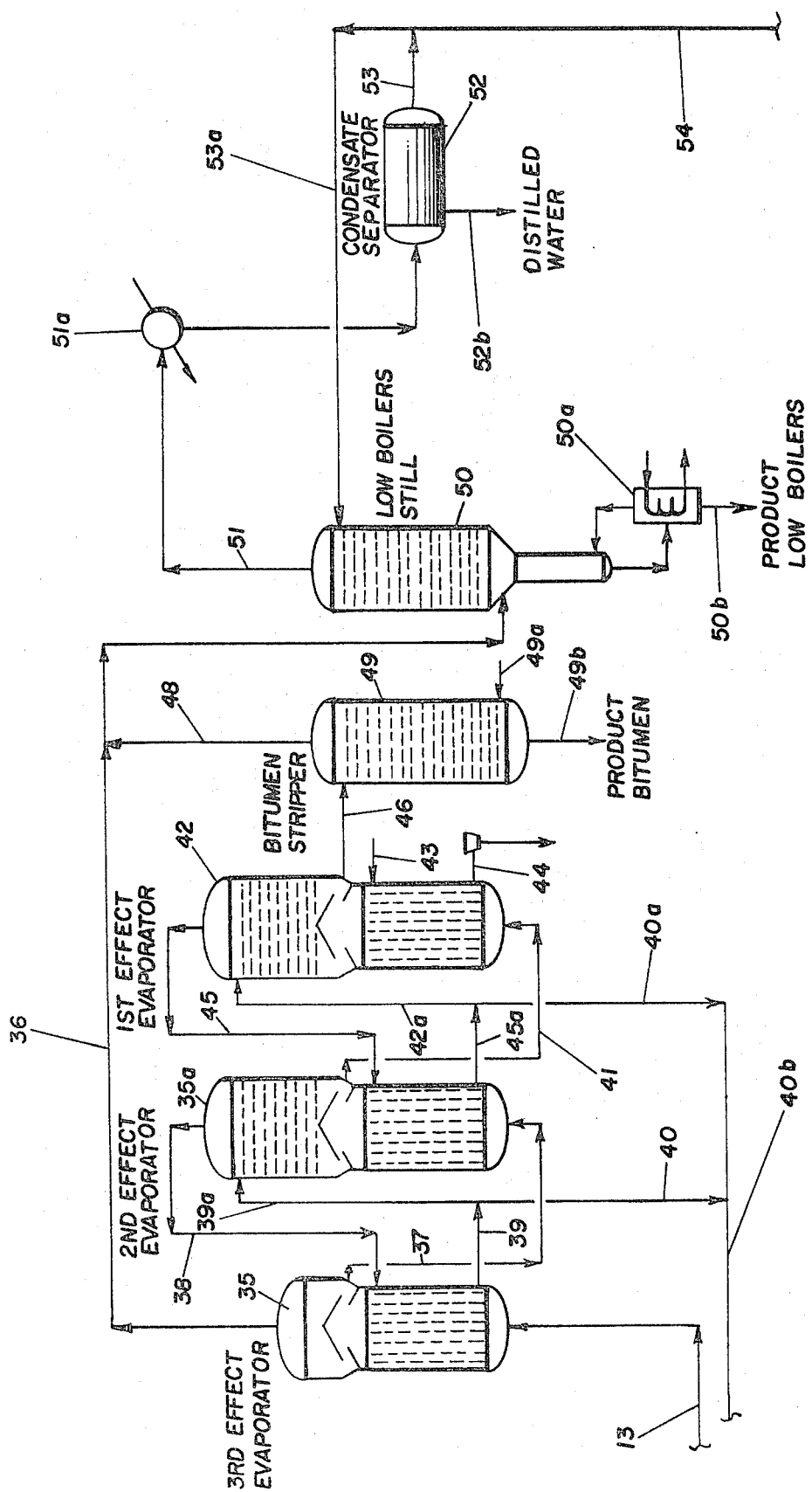
FIG. 4 is a schematic view like FIGS. 2 and 3, but of the area designated C in FIG. 1.

Area C of FIG. 1, enlarged and amplified in FIG. 4, relates to the separation of the miscella entering pipe 13 into its components, which are principally bitumen and solvent. The evaporation process used is that described in my copending application, Ser. No. 905,861 filed May 15, 1978 now U.S. Pat. No. 4,167,470, the contents of which are incorporated by reference herein.

For the separation and recovery of solvent and oil from the extraction process, an evaporation system is used. Miscella in line 13, which comprises oil, solvent and perhaps a small amount of fines, flows to the bottom of the third effect 35 of a triple effect evaporator, in which there is counterflow of liquid and vapor. The first effect 42 and the second effect 35a operate at superatmospheric pressure, and the third effect 35 at lower pressure, preferably atmospheric. Jacket heat is applied to the tubes of evaporator 35 to vaporize part of the solvent in the miscella and a small amount of the low boiling components of the bitumen. Vapor from evaporator 35 flows in pipe 36 to the low boilers still 50.

Partially concentrated miscella flows from evaporator 35 through pipe 37 to the bottom of the second effect evaporator 35a, which has an upper and a lower section. The lower section is a conventional rectification column, whose separation elements may be bubble cap trays, sieve trays, or packing. Vapor generated in evaporator 35a flows through pipe 38 to the heating jacket of evaporator 35, where it is condensed. The condensate in pipe 39 splits into two streams 39a and 40. Stream 39a is refluxed to the rectifying section of evaporator 35a, whose function is to cleanse the vapor rising from the evaporator tubes of the low boilers in the bitumen. Condensed solvent returns to the extraction system through line 40.

Partially concentrated miscella from evaporator 35a flows through line 41 to the bottom of first effect evaporator 42, which has an upper and lower section similar to that already described. Vapor generated in evaporator 42 flows through pipe 45 to the heating jacket of evaporator 35a, where it is condensed. The condensate in pipe 45a splits into two streams 42a and 40a. Stream 42a is refluxed to the rectifying section of evaporator 42. Condensed solvent returns to the extraction system through pipe 40a. High pressure steam that provides heat for the triple effect evaporator enters the heating jacket of evaporator 42 through pipe 43. Condensate flows through pipe 44 to a steam trap.

The last of the solvent is removed from the bitumen in the bitumen stripper 49. Concentrated miscella enters at the top of the stripper through pipe 46, and flows downward through trays or packing countercurrent to rising steam which enters at the bottom through pipe 49a. The stripper operates at the same pressure at the third effect evaporator, preferably atmospheric. Stripped bitumen product, essentially solvent-free, leaves the stripper at its bottom through pipe 49b. Vapor from the stripper in line 48, which comprises solvent, water and low boilers, joins the vapor in line 36, and the combined vapors flow to the low boilers still 50.

The low boilers still is a conventional distillation apparatus comprising a rectification and a stripping section, located respectively above and below the feed point. Since the low boilers have an approximate boiling range between 400° and 500° F., they are readily fractionated from solvent, which should not have in it hydrocarbons boiling above 250° F. Vapor from the low boilers still, comprising solvent and water, flows through line 51 to the condensate 51a. Condensate flows to the condensate separator 52, where the immiscible solvent and water phases are separated. Hydrocarbon overflows through pipe 53, then splits into two streams 53a and 54. Stream 53a is refluxed to the low boilers still; stream 54 recycles solvent to the extraction system. Bottoms from the low boilers still are reboiled in reboiler 50a, which may be heated with hot circulating oil or the like. Product low boilers leave the process through pipe 50b.

Figure 5:
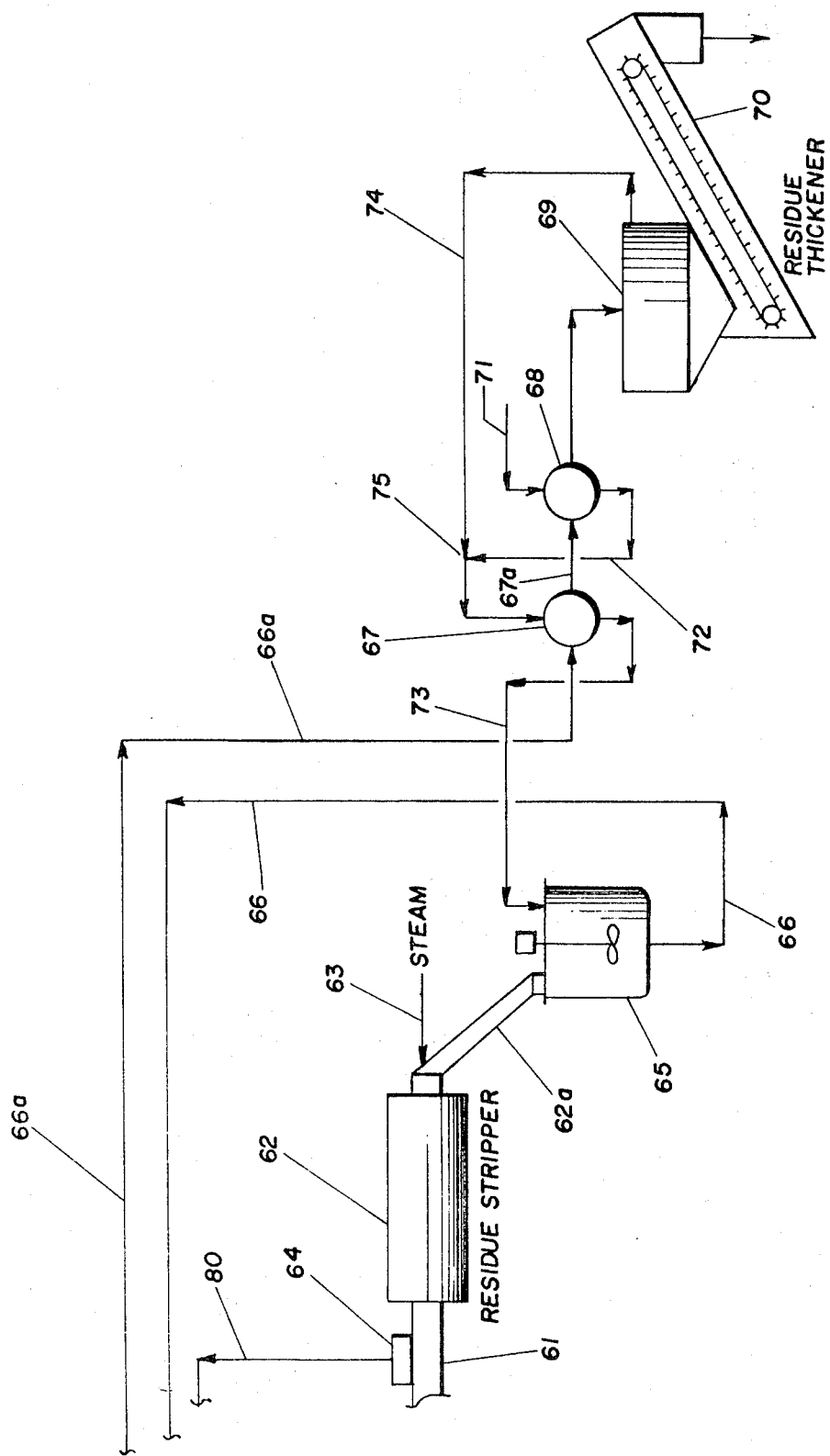
FIG. 5 is a schematic view similar to FIGS. 2, 3, and 4 of the area designated D in FIG. 1.

Area D of FIG. 1, shown more completely in schematic view in FIG. 5, is concerned with the treatment of solvent-wet spent residue from the conveyor 31 in area B, where the residues from the filter 14 and the drag belt 32 are combined. The combined residues fall from the conveyor 31 through a chute 60 into the conveyor 61 which feeds the residue into a stripper 62 where the solvent retained in the spent residue is removed. In the stripper, here schematically shown as a rotary kiln, the solvent-wet residue is tumbled in a stream of steam introduced into the drum at its opposite end, as indicated at 63. The steam vaporizes the solvent in the residue. The combined water and solvent vapors are removed from the charging end of the drum through the feed conveyor 61 and hood 64. The residue, stripped of solvent, is discharged through chute 62a at the right hand end of the drum. Rotary kilns of this kind are well known in various industrial operations and means (not shown) is provided in the conveyor 61 for moving the residue therethrough into the drum without blocking the outflow of vapors into the hood 64 mounted on the conveyor 61. One means for so moving the wet residue might be a screw conveyor (not shown) or a vibrating conveyor (not shown) or, by arranging the drum at a lower elevation, the wet residue might enter the drum by gravity (also not shown).

As previously stated, stripped residue is discharged from the drum through duct 62a. The hot residue is discharged into mixer 65 where it is agitated with preheated water, forming a hot spent sand slurry. Part of its sensible heat can be recuperated from the slurry so formed by the indirect transfer of heat to the incoming fresh sand-miscella feed slurry flowing through pipe 8 as it passes through the heat exchanger 9. In the arrangement here shown, the hot spent sand slurry is circulated through pipe 66 to the entering side of heat exchanger 9 to flow in countercurrent heat exchange relation with the feed slurry flowing through pipe 8. It may be explained that this and the other heat exchangers hereinafter described may desirably be of the so-called spiral interchanger type, in which the two streams between which heat is interchanged follow countercurrent spiral paths separated by heat transfer surfaces. Either or both streams may be slurries. The spent sand slurry flows from its outlet at 9 through pipe 66a to the residue-water heat exchanger 67 and from this through pipe 67a into a second exchanger 68. From 68 the spent sand slurry discharges into the residue thickener 69. To minimize water loss in the sand, the wet sand is carried from the bottom of the thickener 69 by a conveyor 70, similar to conveyor 31 in FIG. 3, to a point of discharge. The sand may be disposed of as clean, environmentally acceptable waste.

Make-up water, supplied from a source not shown, flows from pipe 71 through heat exchanger 68, where, upon becoming initially warmed, it flows through pipe 72 to join overflow water from the thickener 69 in line 74. The combined streams in line 75 enter the heat interchanger 67, where they are further heated. From the outlet of 67 the now heated water flows through pipe 73 into the residue mixer 65. Although it would be possible to eliminate heat exchanger 68 and feed the make-up water in line 71 directly to heat exchanger 67, to do so would be at the expense of losing more of the heat in the spent sand.

Vapors leaving the residue stripper 62 condense at a temperature higher than that of the slurry that is supplied to interchanger 10. The vapors, which are discharged from the charging end of the stripper through the hood 64, flow through pipe 80 to supply heat to the second feed slurry heat interchanger 10 to further raise the temperature of the feed-slurry. Condensate is discharged into pipe 81 leading to the inlet end of condensate separator 82. Hot condensates flowing from the multi-effect evaporator into pipes 40 and 40a (FIG. 4) join in line 40b and are carried by pipe 40b to the inlet end of condensate separator 82 to combine with the condensate in line 81. Condensate in line 81 comprises solvent and water; condensate in line 40b would normally have little water. Water is withdrawn from the bottom of the separator 82 while the water-immiscible solvent overflows into pipe 83, which, with pipe 54, joins pipe 30 (FIG. 3). The combined streams discharge into the fifth or last thickener of the countercurrent decantation system.

Since the combined condensates in line 83 may be at a higher temperature than is desirable for extraction, a solvent cooler 83a may be provided in pipe 83.

The relatively coarse sand and miscella mixture from the bottom of the first thickener introduced into the top of the second thickener is, of course, hot from the hot feed mix continuously discharged into the first thickener. Hot solvent, as above described, is discharged into the fifth thickener so that, notwithstanding heat losses in the series of thickeners, the countercurrent movement of the relatively coarse sand feed and the hot solvent from the pipe 30, the contents in each thickener are at an elevated temperature. As a result, the miscella flowing through pipe 4 from the thickener 18 to combine with the incoming sand at 3 is at a temperature of the order of 160° F. to 165° F., or thereabout.

The use of thickeners, wherein solvent and solids such as sand are contacted, with the heavier components settling to the bottom of the thickener and the finer and lighter components being withdrawn at the top of the thickener, is referred to in the art as "decanting," whereas the draining of solvent through a mass or bed of the solids is termed "percolating."

Figure 6:
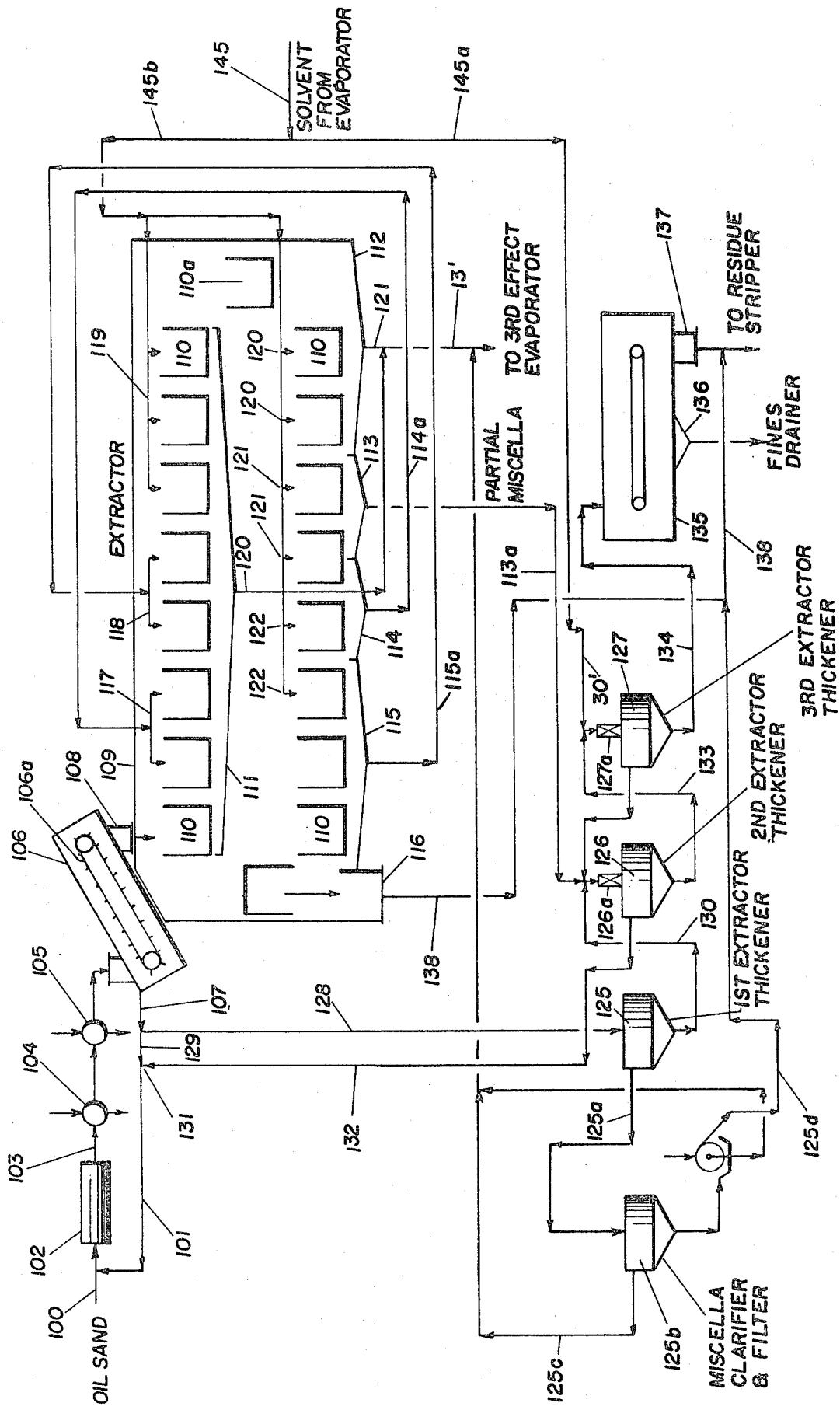
FIG. 6 discloses a modification wherein the coarser material is subjected to a percolation procedure as contrasted to the decanting process of FIGS. 1 to 5.

In the foregoing description a decanting procedure is described and is most applicable where the sand is comprised largely of finer particles which compact into masses too dense for the effective percolation of solvent or miscella therethrough. While the process shown in FIGS. 2 and 3 may be used with sand comprised mostly of coarser particles, the extraction process and apparatus disclosed in FIG. 6 is preferred with coarse sand, that is, for example, sand wherein the percentage of particles smaller than 50 mesh (U.S. standard screen size) is of the order of 20% or less. There are extensive deposits of such sand. Also, the process shown in FIG. 6 is particularly adapted for use where the processing of large tonnages of this coarser sand is contemplated.

In FIG. 6 the oil sand, entering through a seal as described in FIG. 1 (but not here shown), is combined at 100 with miscella supplied through pipe 101, and the combination is discharged into a mixer 102 where it is thoroughly mixed to produce a flowable slurry. The slurry flows from the mixer through pipe 103 in which there are two feed slurry interchangers 104 and 105 in series, as in FIGS. 1 and 2. Pipe 103 discharges into an elutriator 106 designed to separate relatively coarse particles, larger than, for instance, 50 mesh, from relatively fine particles. Most of the miscella with the fines overflows into pipe 107, while the coarser sand settles toward the bottom to be conveyed upwardly by a drag belt conveyor or the like schematically indicated at 106a to a discharge outlet or chute 108 that opens into an enclosure 109.

Proper design and operation of the elutriator 106 is important in the practice of my invention. The elutriator serves two purposes: to classify the sand particles by size and to produce thickened elutriator bottoms of controlled consistency. The purpose of elutriation is to remove from the sand the fine particles that would otherwise prevent percolation of miscella through a bed of sand at practical rates. Sand particles smaller than 50 mesh normally are removed. Even then, the percolation rate of solvent through a bed of the remaining coarse sand is seldom more than 2 gallons per minute per square foot, by most standards a very slow rate. For the more viscous miscella, the rate is even less. The sand content of the underflow from the elutriator should, in general, be as high as possible, since any excess miscella carried into the percolation extractor has to drain through the beds in the baskets. The additional time required for this to take place can add considerable cost to the extractor.

It will now be apparent why it is important to heat the feed slurry before it enters the elutriator. The bitumen which enters the feed mixer in the oil sand must be completely in solution before the slurry reaches the elutriator. Otherwise, the sand particles are not completely separated and may not behave in accordance with the true particle size.

Within the enclosure 109 there is a percolation extractor of a type well known in the art, and generally as disclosed in U.S. Pat. No. 2,663,624. This extractor has transversely elongated baskets 110 with perforated bottoms carried on endless chains that move in succession below the discharge chute which is so arranged that, during the interval that a basket is beneath its chute, the discharge from the chute will form beds about two feed deep throughout the length and width of the basket. The apparatus as disclosed in said patent, however, is not ideally suited for purposes of my invention because the baskets are necessarily spaced from one another so that the discharge from the elutriator and subsequent sparging nozzles could fall between any two consecutive baskets as one moved from under the chute or sparging position before the following one moved into position. Therefore, I employ a modified construction, not here shown, which is disclosed in a copending application of A. F. Saxon, Ser. No. 969,986, filed Dec. 15, 1978 now U.S. Pat. No. 4,221,764, incorporated herein by reference, and assigned to the same assignee as the present application. In this extractor, dividers are arranged to travel with the baskets to divide and divert a falling stream or streams of slurry or liquid from a leadng basket into a following one as the space between each two baskets moves beneath the chute or spargers. These dividers, however, are clear of the baskets when the baskets are inverted for dumping the wet residue after the free liquid has been drained therefrom. In FIG. 6, the extractor is shown only schematically, but is more fully shown in said Application Ser. No. 969,986.

In FIG. 6 there is a fixed tray 111 under the baskets in the upper run of the succession of traveling baskets for receiving extract that drains from the baskets. This tray extends the full length of said upper run, but does not extend under that end, here shown as the right end, where the baskets move from the upper run of the endless succession downwardly to the lower run, as schematically indicated at 110a. Under the lower run of the extractor baskets there is a succession of fixed pans, beginning with 112 at the right, which will catch any drainage from the baskets such as 110a descending from the upper run to the lower one. The next pan in the series of lower fixed pans is 113, followed by 114, with 115 at the left end as here shown. To the left of 115, the baskets return upwardly to the top run and, in so doing, there are inverted over residue receiving compartment 116, as shown at the left side of FIG. 6. After dumping the extracted residue, the baskets are returned to the upright position and pass under chute 108 to receive another charge of the coarse sand feed mix from the elutriator.

As soon as the slurry is received by a basket from under the chute 108, the miscella from the feed mix drains through the basket into the tray or pan 111. At position 117 are first upper spargers through which the drainage from the lower baskets over pan 114 is pumped through the line 114a. Spargers 117 are followed by spargers 118 supplied from the last or left pan 115 through pipe 115a. Hot solvent from pipe 145b is supplied to the remaining group of upper run spargers 119 and also the first section of baskets on the lower run over pan 112. Finally, pan 113 receives drainage from baskets on the lower run, these baskets moving under solvent releasing spargers 121. Solvent is also supplied from spargers 122 to baskets as they move over pan 114 and partially over pan 115. In this arrangement there is, therefore, generally a countercurrent flow of solvent and the feed mix comprising coarse sand and miscella as in the decantation process of FIGS. 1 and 3.

All of the liquid collected in the upper tray 111 and in tray 112 flows through line 120 and 121 into line 13' leading, as does line 13 of FIG. 1, to the triple-effect evaporator (not shown, since it duplicates the one shown in FIGS. 1 and 4). Drainage into tray 113 is a partial miscella in which solvent predominates, and it flows through pipe 113a to the inlet of the second of a series of thickeners, the first of which is designated 125, the second, 126, and the third and last, 127, which comprise a countercurrent decantation system for extraction of bitumen from the fine sand in the overflow from the elutriator.

Starting with the first thickener 125, it receives part of the overflow from the elutriator 106 and pipe 107 through branch pipe 128. This, as before explained, is the fraction of the feed mix comprising miscella in which the finer sand particles are contained. Some of this sand overflow may be recycled through pipe 129 to combine, while hot, directly with the incoming feed sand. Underflow from the first thickener 125 is fed to the in-line mixer 126a at the top of the second thickener 126 through line 130, while overflow from the first thickener is discharged into pipe 125a leading to a clarifier and filter arrangement (schematically indicated at 125b, which duplicates that shown in FIGS. 1 and 2). In those instances where there are only minor amounts of fine particles in the solid feed material, it may be that no thickeners are required, in which event the overflow from the elutriator, through pipe 28, would be fed directly to the clarifier and filter arrangement 125b. The clarified and filtered miscella discharged into pipe 125c may join pipe 13' leading to the triple-effect evaporator; but this connection is not completey shown in FIG. 6. The miscella discharged through the pipe 13' of the percolation extractor is discharged into the third effect of the triple-effect evaporator, as is the miscella from pipe 13 in FIG. 1. Spent fine sand from the clarifier filter is carried, as in FIG. 1, to the residue stripper 62 through duct 125d.

Miscella from the second thickener 126 overflows into pipe 132 which joins pipe 129 at 131. This miscella is mixed with the incoming feed sand. Underflow from the second thickener 126 is transferred through pipe 133 to the in-line mixer at the top of the third thickener 127. The partial miscella comprising the overflow from thickener 127 combines with the partial miscella from pipe 113a so that both enter the in-line mixer 126a at the top of the second thickener 126.

Underflow from the thickener 127, comprising washed sand and some solvent, is discharged through line 134 into a drainer 135 where the sand forms a bed on a perforated endless belt through which solvent drains. The drainage removed at 136 may be recycled to the in-line mixer 126a at the top of the thickener 126. Spent fines are discharged from the drainer through outlet 137 and are combined with the wet spent residue leaving the traveling basket percolator through outlet 138, and the combined wet residues then enter the residue stripper 62 (not shown in FIG. 6, but as disclosed in FIGS. 1, 3 and 5).

Although not duplicated in FIG. 6, heat is recuperated by heat interchange with the feed slurry in heat exchangers 104 and 105 corresponding to 9 and 10, respectively, of FIG. 1. Hot solvent is supplied from the solvent recovery system of FIGS. 1 and 4 through the direct return of solvent to the extraction processes of FIG. 6 through pipe 145. Hot solvent is supplied through pipe 145a to the countercurrent decantation system through in-line mixer 127a. Hot solvent is also supplied through pipe 145b to spargers in the upper and lower runs of the horizontal basket percolator, as shown in FIG. 6.

In the systems shown in FIG. 1 and FIG. 6, feed sand and returned hot miscella are mixed to form a slurry that is further heated to a progressively higher temperature by flow through a series of at least two feed slurry heat exchangers using heat recuperated from vapor and the hot spent sand from a residue stripper. In both systems, gravity separates the hot feed slurry into two separate streams, one containing miscella and finer sand particles and the other containing miscella and coarser sand particles. The spent residue resulting from the processing of both of the streams is reunited and the solvent removed therefrom in a steam stripper. Vapor comprising solvent and water, so produced, heats the feed slurry. In both systems, the miscella is subjected to evaporative separation of the solvent and product bitumen. The recovered hot solvent is recycled to effectively extract the bitumen from the sand. In both systems, heat is recuperated from the spent residue and circulated through feed slurry heat exchangers.

Depending on the layout of the different elements of the extraction, residue stripping, and heat recuperating elements of the system, circulating pumps will be provided in various lines, but these have not been illustrated since the arrangement of the elements in some cases may permit gravity flow while, in other cases, the disposition of elements may require a different specific arrangement with pumps elsewhere. The use of pumps at certain locations is, therefore, simply a matter of engineering, to be determined by specific circumstances in each plant and readily accomplished by one skilled in the art, and their inclusion is not critical to this disclosure.

I claim:

1. In an apparatus for the continuous extraction of bitumen from oil sand having means for continuously producing a feed slurry by mixing said oil sand and a miscella comprising solvent and bitumen, and a means for separating the feed slurry into an overflow stream having primarily finer particles of feed sand dispersed therein and an underflow stream having primarily coarse particles of feed sand dispersed therein and means for separately washing with solvent the sand in the underflow and overflow streams, the improvement comprising:

(a) means for washing the sand in said overflow stream by countercurrent decantation with solvent to produce a first miscella and spent fine sand;
    (b) means for washing the sand in said underflow stream wherein the sand, confined in beds, is countercurrently washed by solvent, which percolates through the beds by gravity, to produce a second miscella and spent coarse sand, comprising a horizontally traveling conveyor with a continuous succession of strainer baskets arranged to receive, in turn, the underflow stream, stationary compartments under said baskets over which they travel which collect liquid draining from the baskets, sparger means arranged to discharge liquid into the baskets as they are carried beneath the sparger means by the conveyor, means for circulating liquid from some of the compartments to some of the sparger means, and means for removing from at least one of the compartments liquid comprising said second miscella;
    (c) means for steam stripping solvent from the spent fine sand and the spent coarse sand;
    (d) means for evaporation in which said first and second miscellas are separated into product bitumen and solvent; and
    (e) means for recycling solvent recovered in said evaporation means and in said sand stripping means to both said means for washing sand.

2. In an apparatus for the continuous extraction of bitumen from oil sand as defined in claim 1, the improvement including means for combining the spent fine sand and spent coarse sand for stripping with steam.

3. In an apparatus for the continuous extraction of bitumen from oil sand as defined in claim 1, means for heating said feed slurry, and means for transferring hot vapors, formed in said means for steam stripping, to said means for heating.

* * * * *